United States Patent
Sethuraman et al.

(10) Patent No.: US 8,995,718 B2
(45) Date of Patent: Mar. 31, 2015

(54) SYSTEM AND METHOD FOR LOW COMPLEXITY CHANGE DETECTION IN A SEQUENCE OF IMAGES THROUGH BACKGROUND ESTIMATION

(71) Applicant: Ittiam Systems (P) Limited, Bangalore (IN)

(72) Inventors: Sriram Sethuraman, Karnataka (IN); Santhoshkumar Chilkundasrinivasamurthy, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 232 days.

(21) Appl. No.: 13/649,128

(22) Filed: Oct. 11, 2012

(65) Prior Publication Data

US 2014/0105498 A1  Apr. 17, 2014

(51) Int. Cl.
G06K 9/00 (2006.01)
H04N 7/18 (2006.01)
G06T 7/20 (2006.01)

(52) U.S. Cl.
CPC .............. *G06T 7/20* (2013.01); *G06K 9/00664* (2013.01)
USPC .......................................... 382/103; 348/154

(58) Field of Classification Search
CPC ....... G06T 7/20; G06T 7/2006; G06T 7/2013; G06T 2207/10016; G06K 9/34; G06K 9/00369; G06K 9/00664; G08B 13/19602
USPC .......... 382/103, 107, 173, 180, 224; 348/143, 348/154
See application file for complete search history.

(56) References Cited

U.S. PATENT DOCUMENTS

| | | | |
|---|---|---|---|
| 5,969,755 A * | 10/1999 | Courtney | 348/143 |
| 6,816,627 B2 * | 11/2004 | Ockman | 382/284 |
| 6,931,146 B2 * | 8/2005 | Aoki et al. | 382/107 |
| 7,280,753 B2 * | 10/2007 | Oya et al. | 396/429 |
| 7,457,436 B2 * | 11/2008 | Paragios et al. | 382/103 |
| 8,218,831 B2 * | 7/2012 | Tian et al. | 382/118 |
| 8,243,991 B2 * | 8/2012 | Das et al. | 382/103 |
| 8,432,448 B2 * | 4/2013 | Hassapis et al. | 348/153 |

* cited by examiner

*Primary Examiner* — Kanjibhai Patel
(74) *Attorney, Agent, or Firm* — Prakash Nama; Global IP Services, PLLC

(57) ABSTRACT

A method for low complexity change detection in a sequence of images using configurable block sizes is disclosed. In one embodiment, a first change detection map is generated by performing change detection based on configurable block sizes between a current image and one of an estimated first background image and a previous image. The first change detection map classifies each block as changed or unchanged. The selection between the previous image and the estimated background image for use in change detection is done using a confidence estimate, which is updated both at the low level and at the end of a high-level change analysis. In another embodiment, an estimated second background image is used in addition to the estimate first background image to help quickly adapt when a stationary object starts moving or when a scene object becomes stationary.

24 Claims, 5 Drawing Sheets

| MOTION DETECTION AGAINST BG1 302 | MOTION DETECTION AGAINST BG2 304 | FIRST BACKGROUND IMAGE UPDATE 306 | SECOND BACKGROUND IMAGE UPDATE 308 |
|---|---|---|---|
| MOVING | MOVING | DO NOT UPDATE | DO NOT UPDATE |
| MOVING | NON MOVING | UPDATE | DO NOT UPDATE |
| NON MOVING | MOVING | UPDATE | DO NOT UPDATE |
| NON MOVING | NON MOVING | UPDATE | UPDATE |

300

SYSTEM AND METHOD FOR LOW COMPLEXITY CHANGE DETECTION IN A SEQUENCE OF IMAGES THROUGH BACKGROUND ESTIMATION

FIELD OF TECHNOLOGY

Embodiments of the present invention relate to the field of video processing and video analytics. More particularly, embodiments of the present invention relate to a system and method for low complexity change detection in a sequence of images through background estimation and subtraction.

BACKGROUND

Background estimation and subtraction is a common method used for change detection (also known as motion detection) that is a first stage in many object tracking, object counting, and/or background substitution algorithms. The key challenges in this problem are, sensitivity to noise, sensitivity to slow intensity variations, the rate at which the background learns an object that was moving but has now come to a stop, and the rate at which the background unlearns an object that was stationary earlier, but has started to move now.

The background should be able to adapt to abandoned objects and initial objects that move out. The abandoned objects must be blended into the background, while objects that were initially present in the background but later moved must be erased from the background. Existing methods use a single estimated background image, which tends to have weaknesses in learning objects that have come to a stop or unlearning objects that have started to move. Further, existing methods used for change detection may perform motion detection on every input pixel, which results in a higher computational complexity and are not robust enough to include the entire moving object.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A system and method for low complexity change detection in a sequence of images through background estimation is disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "estimated first background image" and "first background image" are used interchangeably throughout the document. Also the terms "estimated second background image" and "second background image" are used interchangeably throughout the document.

The present invention uses configurable block sizes (e.g., m×n pixels) for change detection in a sequence of images. Further, the present invention uses two estimated background images to handle the problem of learning the uncovered background faster for the change detection in the sequence of images. Furthermore, a concept of a confidence map determines whether the change detection should run against the estimated background image or against the immediately previous picture. Also, higher level motion detection is done by performing morphological filtering operations to fill in the low-level change detection map and then running a connected component analysis to group all connected blocks as a cluster. In this case, a highly efficient single-pass connected component analysis is used.

Further, the properties of the cluster such as shift in median location of the cluster are analyzed to conclude whether there is a change in the position of the cluster. In addition, the low level change detection and the cluster level change detection are linked by updating the confidence entry of a block if it was earlier classified as moving, but is a part of a cluster concluded as non-moving. Therefore, by using the above method, the present invention provides robust change detection while maintaining a low computational complexity. The above method is described in more detail with respect to FIGS. 1-5 as follows.

Figure 1:
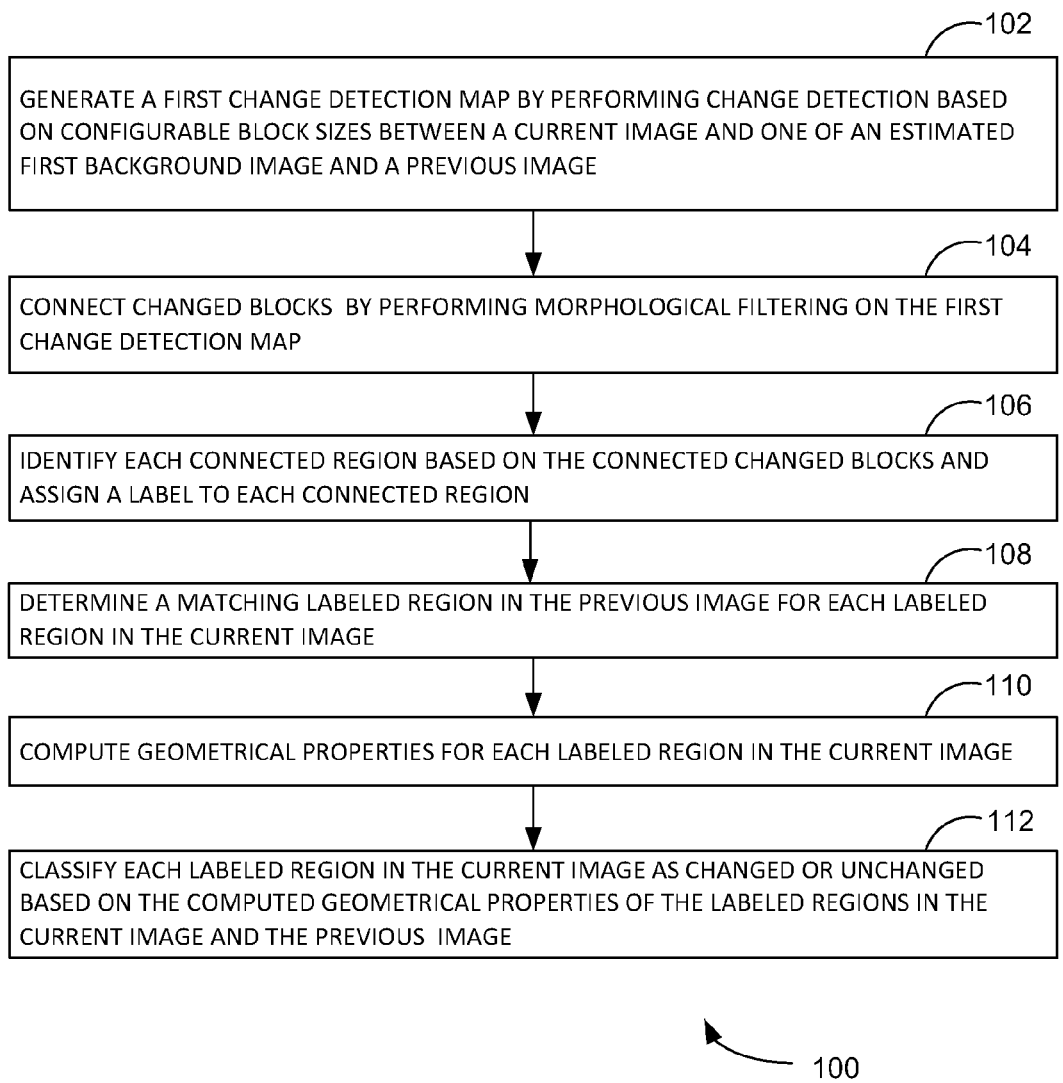
FIG. 1 illustrates a process flow for low complexity change detection in a sequence of images through background estimation, according to one embodiment.

FIG. 1 illustrates a process flow 100 for low complexity change detection in a sequence of images through background estimation, according to one embodiment. In step 102, a first change detection map is generated by performing change detection based on configurable block sizes between a current image and one of an estimated first background image and a previous image. The first change detection map classifies each block as changed or unchanged. The first change detection map is a block level motion detection map. i.e., the change detection is performed on the configurable block of pixels instead of every input pixel. For example, the configurable block includes a block of M×N pixels.

In generating the first change detection map, a first block level change metric is determined between the current image and one of the estimated first background image and the previous image. Further, it is classified whether each block has changed or unchanged by comparing the associated first block level change metric against an associated block level noise threshold. Furthermore, a confidence metric is computed based on the determined first block level change metric. The confidence metric is a number between 0 and 1. Then, one of the estimated first background image and the previous image is selected based on the confidence metric for generation of the first change detection map for a next image. Then the block level noise threshold and the confidence metric are updated based on the first block level change metric. Also, the first background image is updated based on the confidence metric.

In one embodiment, if selection of one of the estimated first background image ($B1_{n-1}$) and the previous image ($I_{n-1}$) for the current image ($I_n$) is equal to the previous image and the confidence metric is greater than a first threshold ($C_{thr}^{hi}$), then the updated first background image ($B1_n$) is selected for the next image ($I_{n+1}$). Else if selection of one of the estimated first background image and the previous image for the current image is equal to the previous image and the confidence metric is less than or equal to the first threshold, then the current image is selected for the next image. Else if selection of one of the estimated first background image and the previous image for the current image is not equal to the previous image and the confidence metric is less than or equal to a second threshold, then the current image is selected for the next image. In these embodiments, the second threshold is less than the first threshold. Else if selection of one of the estimated first background image and the previous image for the current image is not equal to the previous image and the confidence metric is greater than the second threshold, then the updated first background image is selected for the next image.

Furthermore, classification of whether each block has changed or unchanged is performed as follows. First, sum of squared difference (SSD) between the block in the current image and the corresponding block in the estimated first background image or previous image is computed, normalized and compared against the associated block level noise threshold for that block. If exceeded, then the block is classified as moving, else the block is classified as non-moving. The block SSD and normalized block SSD are calculated using the following formula:

$$\text{Block } SSD = \sum_{blk} (a-b)^2/(\text{Process block size} \times \text{SIGMA\_COEFF}),$$

and $$\text{Normalized Block } SSD = (\text{Block } SSD/(\text{SIGMA\_COEFF} * T_n))$$

Wherein, a refers to a block in the current image ($I_n$), b refers to a co-located block in the previous image ($I_{n-1}$) or the estimated first background image, $T_n$ refers to the block level noise threshold (which is initialized with an empirical value at the beginning of a sequence of images and updated after processing each frame), and SIGMA_COEFF is a scaling factor used for the associated block level noise threshold.

The SSD is compared against the noise threshold to set the change detection or motion detection (MD) flag.

```
If (Block SSD > T_n)
    MD = moving block
Else
    MD = non moving block.
```

In step 104, changed blocks are connected by performing morphological filtering on the first change detection map. In these embodiments, the morphological filtering such as dilation and erosion are performed to refine the first change detection map. For example, two passes of dilation of the first change detection map is performed to fill regions (i.e., holes in a detected moving object), while one pass of erosion of the first change detection map is performed to remove stray blocks (i.e., noise/markings around the moving object) detected as moving. In other words, the first round of dilation is lenient and fills holes however increases the object size, the second round of dilation fills any existing holes without further increasing the object size, the one round of erosion contains the object size by removing extra layer added during the two passes of dilation.

In step 106, each connected region is identified based on the connected changed blocks and a label is assigned to each connected region. In these embodiments, the connected changed blocks in a current row of the first change detection map are grouped in a raster scan order. Further, the groups in the current row are merged and labeled with connected groups in a previous row until all the connected groups are labeled.

In step 108, a matching labeled region in the previous image is determined for each labeled region in the current image. In step 110, geometrical properties are computed for each labeled region in the current image. For example, the geometrical properties include aspect ratio and centroid and so on. In step 112, each labeled region in the current image is classified as changed or unchanged based on the computed geometrical properties of the labeled regions in the current image and the previous image.

Furthermore, the confidence metric of all blocks of the labeled regions in the current image are modified based on the classification. In addition, the first background image is updated based on the modified confidence metric.

Figure 2:
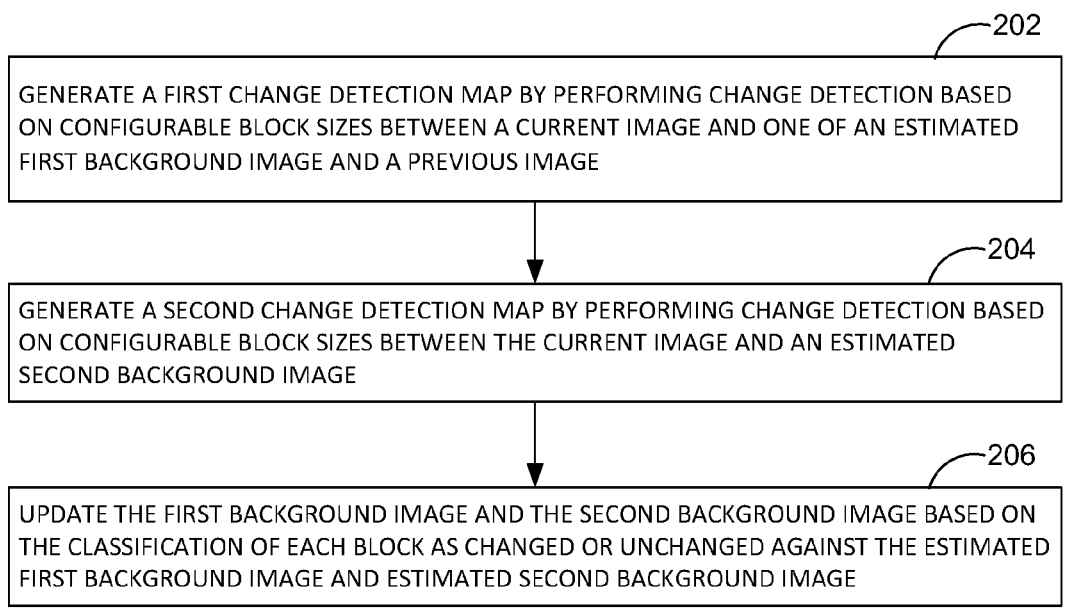
FIG. 2 illustrates a process flow for updating the first background image and the second background image, according to one embodiment.

FIG. 2 illustrates a process flow 200 for updating the first background image and a second background image, according to one embodiment. In step 202, a first change detection map is generated by performing change detection based on configurable block sizes between a current image and one of an estimated first background image and a previous image. The first change detection map classifies each block as changed or unchanged. This step is similar to step 102 of FIG. 1. In this case, the estimated first background image is a quickly updating background.

In generating the first change detection map, a first block level change metric is determined between the current image and one of the estimated first background image and the previous image. Further, it is classified whether each block has changed or unchanged by comparing the associated first block level change metric against an associated block level noise threshold. Furthermore, a confidence metric is computed based on the determined first block level change metric. Then, one of the estimated first background image and the previous image is selected based on the confidence metric for generation of the first change detection map for a next image.

Furthermore, classification of whether each block has changed or unchanged is performed as follows. First, sum of squared difference (SSD) between the block in the current image and the corresponding block in the estimated first background image or previous image is computed, normalized and compared against the associated block level noise threshold for that block. If exceeded, then the block is classified as moving, else the block is classified as non-moving.

In step 204, a second change detection map is generated by performing change detection based on configurable block sizes between the current image and an estimated second background image. The second change detection map classifies each block as changed or unchanged. In generating the second change detection map, a second block level change metric is determined between the current image and the estimated second background image. Then each block is classified as changed or unchanged by comparing the associated second block level change metric against the associated block level noise threshold.

The estimated second background image is a slowly updating background, i.e., the estimated second background image is updated relatively slower than the estimated first background image. In other words, the difference between the estimated first background image and the estimated second background image is the frequency with which they are updated. In one exemplary implementation, the estimated first background image is updated every frame, the estimated second background image is updated relatively slowly, i.e., only when there is no motion at all. The estimated second background image aids the updating of the estimated first background image during state-changes (like blending new objects or erasing old objects).

In change or motion detection, the first frame is taken as an initial background. Hence, the estimated first background image is initialized to the first frame in the first process call. The estimated second background image is not used in the beginning. The estimated second background image inherits the estimated first background image when there is sufficient confidence in the estimated first background image. The estimated second background image is updated only when the block is truly non-moving. Alternatively, the estimated second background image inherits the estimated first background image when a change can be considered as a permanent one.

Furthermore, classification of whether each block has changed or unchanged is performed as follows. First, sum of squared difference (SSD) between the block in the current image and the corresponding block in the estimated second background image is computed, normalized and compared against the associated block level noise threshold for that block. If exceeded, then the block is classified as moving, else the block is classified as non-moving.

In step 206, the first background image and the second background image are updated based on the classification of each block as changed or unchanged against the estimated first background image and estimated second background image. In these embodiments, the first background image is updated when the block is classified as unchanged in at least one of the first change detection map and the second change detection map, and both the first background image and the second background image are updated when the block is classified as unchanged in both the first change detection map and the second change detection map. Updating the first background image and the second background image is explained in detail using truth table of FIG. 3.

Figure 3:
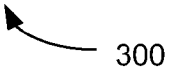
FIG. 3 illustrates a truth table depicting the updated first background image and the second background image, according to one embodiment.

FIG. 3 illustrates a truth table 300 depicting the updated first background image and the second background image, according to one embodiment. The truth table 300 illustrates a motion detection against the estimated first background image (i.e., quickly updating background (bg1)) field 302, a motion detection against the estimated second background image (i.e., slowly updating background (bg2)) field 304, a first background image update field 306 and a second background image update field 308.

It can be noted from the truth table 300 that the first background image update field 306 is not updated (e.g., as shown in row 1 of the field 306) only when the block is classified as moving with respect to both the estimated first background image and the estimated second background image (as shown in row 1 of the fields 302 and 304 respectively). In all other cases, the first background image is updated (as shown in rows 2, 3, and 4 of the field 306), thereby adapting to changes more quickly.

Further it can be noted from the truth table 300 that the second background image update field 308 is updated (as shown in row 4 of the field 308) only when the block is classified as non-moving with respect to both the estimated first background image and the estimated second background image (as shown in row 4 of the fields 302 and 304 respectively).

Furthermore, the second and the third rows of the truth table 300 correspond to transient states (e.g., abandoned objects and missing objects) and the first background image update field 306 is only updated during transient states. The second background image update field 308 is updated only in the steady state, i.e. if the object stays in the region for a 'long' time.

For example, consider an object initially present in both the estimated first background image and the estimated second background image. If the object moves out of the scene, the first background image quickly adapts to the change. But, since the object will be flagged as a moving (missing) object by the second background image, the object may not blend into the second background image. Therefore, a 'count based inheritance' method is implemented. Every time when a block is flagged as "non moving" by the first background image and "moving" by the second background image (3rd row of the truth table), a count (bg2_count) corresponding to the block is incremented. In this case, a bg2 count map is used in updating the estimated second background image. The bg2 count map is a measure of time before which a change can be acknowledged as a permanent one and is a sub-sampled map maintaining the count for each block. The count is set to 0 at initialization. Further, the count is reset to 1 (since 0 indicates bg2 not yet active) if the condition is not met. Once the count reaches a threshold value, the second background image inherits the first background image in the region. Thus, the change gets adapted. The threshold value is a measure of time to wait before acknowledging the change as a permanent one.

In addition, the second row of the truth table 300 shows that the second background image aids the first background image in adapting to the change quickly. For example, consider an object which stays at a place for some time, but not for a long time (i.e., it is not yet updated into the estimated second background image, but only updated into the estimated first background image). Now if the object moves out, then the estimated first background image needs to clean it up. The region is marked as "moving" (i.e., missing) by the estimated first background image and "non moving" by the estimated second background image (e.g., as shown in second row of the truth table 300). Even though there is motion, the estimated first background image is still updated and the object is erased.

Figure 4:
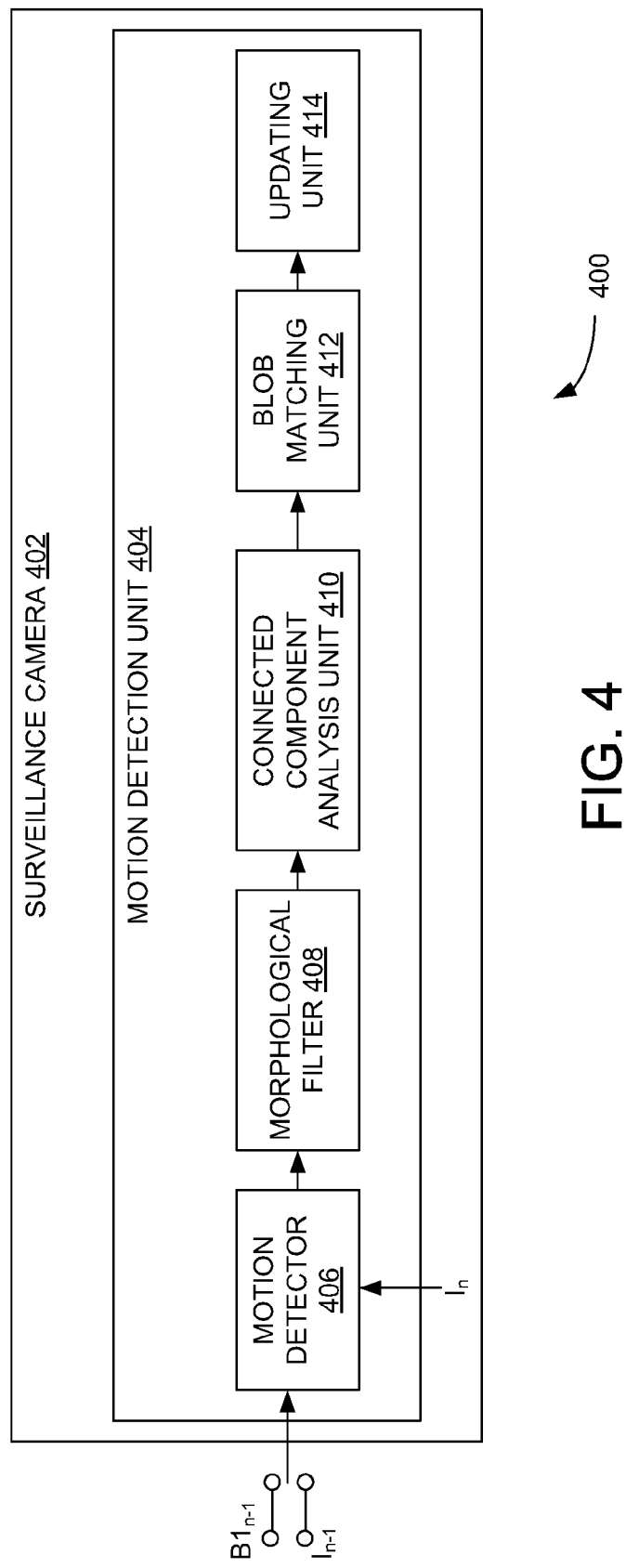
FIG. 4 illustrates a block diagram of a surveillance camera including a motion detection unit, according to one embodiment.

FIG. 4 illustrates a block diagram 400 of a surveillance camera 402 including a motion detection unit 404, according to one embodiment. Particularly, the motion detection unit 404 includes a motion detector 406, a morphological filter 408, a connected component analysis unit 410, a blob matching unit 412, and an updating unit 414.

In operation, the motion detector 406 generates a first change detection map by performing change detection based on configurable block sizes between a current image ($I_n$) and one of an estimated first background image ($B1_{n-1}$) and a previous image ($I_{n-1}$). The first change detection map classifies each block as changed or unchanged. In these embodiments, the motion detector 406 determines a first block level change metric between the current image ($I_n$) and one of the estimated first background image ($B1_{n-1}$) and the previous image ($I_n$). Optionally, the input current image ($I_n$) can be downscaled spatially in both horizontal and vertical directions before inputting into the motion detector 406 in order to reduce the processing complexity.

Further, the motion detector 406 computes a confidence metric based on the determined first block level change metric. Furthermore, the motion detector 406 classifies whether each block has changed or unchanged by comparing the associated first block level change metric against an associated block level noise threshold. Also, the motion detector 406 selects one of the estimated first background image and the previous image based on the confidence metric for generation of first change detection map for a next image.

In one implementation, the motion detector 406 classifies whether each block has changed or unchanged by computing sum of squared difference (SSD) between the block in the current image and the corresponding block in the estimated first background image or previous image. Further, the motion detector 406 normalizes and compares the computed SSD against the associated block level noise threshold for that block. If exceeded, then the motion detector 406 classifies the block as moving, else classifies the block as non-moving.

Further, the morphological filter 408 performs morphological filtering on the first change detection map. The morphological filtering includes dilation and erosion. For example, holes might occur when a previous image ($I_{n-1}$) is used for the SSD calculation because of the overlap of (moving) objects between two frames. In one embodiment, dilation is a region filling operation which can be used to fill the holes in the detected objects. In this case, two rounds of dilation are performed where the first round of dilation is lenient and fills holes however increases the object size and the second round of dilation fills any existing holes without further increasing the object size. Further, the one round of erosion contains the object size by removing extra layer added during the two passes of dilation.

Furthermore, the connected component analysis unit 410 connects changed blocks based on the morphological filtering on the first change detection map and identifies each connected region based on the connected changed blocks, and then assigns a label to each connected region. In one embodiment, the connected component analysis unit 410 identifies each connected region by grouping the connected changed blocks in a current row of the first change detection map in a raster scan order, and then merging and labeling the groups in the current row with connected groups in a previous row until all the connected groups are labeled. These groups are referred to as clusters.

The grouping and labeling (i.e., also referred to as clustering) is implemented as a two step process. First step includes grouping all the moving blocks in the current row of the current image into "runs" and the second step includes merging these runs in the vertical direction at the end of the row's processing. Further, the clusters which do not meet the 'minimum size' criteria can be discarded.

The following data is populated for each cluster:

| Parameter | Description |
| --- | --- |
| (x_min, y_min) and (x_max, y_max) | These are the top-left and bottom-right corners of a (imaginary) rectangular block around the cluster. |
| Width and height | These parameters are the width and height of the rectangular box.<br>width = (x_max − x_min + 1)<br>height = (y_max − y_min + 1) |
| Membership count | This is the number of moving blocks belonging to the cluster. |
| (centre_x, centre_y) | This is the centroid of the cluster. It is calculated using the following formulae:<br>centre_x = Σ xi/membership_count<br>centre_y = Σ yi/membership_count<br>The xi and yi are the co-ordinates of individual moving blocks in the cluster. |
| Histogram | This contains the luma histogram of the cluster. Only moving blocks are taken in to consideration while computing the cluster's histogram. |

The blob matching unit 412 determines a matching labeled region in the previous image for each labeled region in the current image. The blob matching unit 412 computes geometrical properties (e.g., centroid) for each labeled region in the current image and classifies each labeled region in the current image as changed or unchanged based on the computed geometrical properties of the labeled regions in the current image and the previous image. Furthermore, the blob matching unit 412 modifies the confidence metric of all blocks of the labeled regions in the current image based on the classification.

In these embodiments, the blob matching unit 412 checks if the clusters are static or moving. If a static cluster is found, then the confidence in the region is updated as follows.

1. Every cluster in the current frame is matched with a respective cluster in the previous frame. If a successful match is found, then a geometrical property such as centroid is tracked. It involves the neighborhood check and histogram check.
2. Neighborhood check: It is checked whether any of the previous frame's clusters are in the vicinity of the current frame's cluster. An area of +/− (current frame cluster's) width/height around the cluster is searched.
3. Histogram check: If a previous frame cluster is found in the neighborhood, it is checked if the histograms of the two clusters match. It is possible that more than one previous frame cluster passes this check. Hence, the cluster with the best match can be selected.
4. When a match is found, the displacement of the centroid of the cluster between the two frames is calculated. If there is an appreciable displacement of the centroid (e.g., MIN_DISPLACEMENT_OF_BLOB=2), then it indicates the object is moving. Otherwise, the object has come to a halt. In such a case, the confidence in the region is updated.

Further with respect to confidence metric, a concept of confidence maps C1 and C2 is used to determine the change detection of a block or cluster. Confidence maps C1 and C2 are maintained at block-level. The confidence map C1 is updated in the static regions in the updating step. If the picture level pass classifies any moving object as non-moving, then the confidence needs to be updated in that region. Instead of updating C1 at the end of blob matching (i.e., at the end of step 112 of FIG. 1), the confidence in the entire picture is calculated and stored in the confidence map C2. Then C2 is copied into C1 in static regions. Thus, if any moving object is found static at the end of blob matching, C1 only needs to inherit C2, thereby obviating the need for repeating the calculation.

Thus the confidence for the whole frame is calculated and stored in the confidence map C2. Further, C1 inherits C2 if the block/cluster is found to be non-moving. Inheritance at the cluster level happens at the end of step 112 of FIG. 1. Instead of calculating confidence during steps 108-112 of FIG. 1, the calculated confidence metric is calculated initially during step 102 and stored in a separate buffer, thereby obviating the need to save the block SSD.

The infinite impulse response (IIR) equation that governs the C2 update is as follows:

$$C2 = \alpha\_confidence \times C1 + (1-\alpha\_confidence) \times (1-\text{normalized block } SSD)$$

Wherein normalized block SSD=(block SSD/(SIGMA_COEFF*Tn)), and α_confidence refers to the IIR weightage factor/IIR filter coefficient.

In this case, normalized block SSD is clipped to a maximum value of 1. The above equation is implemented in the following manner:

$$C2 = \alpha\_1 \times C1 + \rightarrow \text{First Product}$$

$$\alpha\_2 \times \min(Tn-SSD) \times reci(Tn) \rightarrow \text{Second Product}$$

Wherein $\alpha\_1$ is $\alpha\_confidence$, $\alpha\_2 = (1-\alpha\_1)$

As can be seen from the above equation, the block SSD is inversely proportional to the confidence. A high value of block SSD leads to a fall in confidence. This logic allows the estimated background image to be truly dynamic. If a cluster was found non-moving (i.e., an object came to rest), then the confidence is updated in that region. Since it is a moving region, the SSD in the region is significantly high. Hence, the confidence decreases. Thus, the confidence may continuously decrease over frames. At some point, it may fall below a threshold count (THRESHOLD_CN_2) and switch to $(I_n, I_{n-1})$ path for a motion detection (MD) check. Because the object is present in both the current and previous frames, the region's MD check flags it as non-moving and hence the background gets updated. This way, the object gets blended into the background.

The MD path (($I_n, I_{n-1}$) or ($I_n, B1_{n-1}$)) is calculated using threshold counts (THRESHOLD_CN_1 and THRESHOLD_CN_2) as shown below:

```
If (1 == MD path)              - (I_n, I_{n-1}) Path
    If (updated confidence C1 > THRESHOLD_CN_1)
        MD path = 0            - Switch to (I_n, B1_{n-1}) path
    Else No change             - Do not switch path
Else                           - (I_n, B1_{n-1}) Path
    If (updated confidence C1 <= THRESHOLD_CN_2)
        MD path = 1            - Switch to (I_n, I_{n-1}) path
    Else No change             - Do not switch path.
```

The condition "if (1==MD path)" refers to "if selection of one of the estimated first background image and the previous image for the current image is equal to the previous image". In another embodiment, the component can be configured to export the first change detection map even in skipped frames. In such a case, only motion detection check is done and the first change detection map is generated as follows.

1. Input frame ($I_n$), estimated first background image ($B1_{n-1}$) and threshold buffers are DMAed in.
2. Chrome conversion and horizontal downscaling is done, if needed.
3. Motion detection check is performed with respect to the estimated first background image.
4. Previous frame is not used in SSD calculation. The motion detection path is forced to 0 ($I_n, B1_{n-1}$) beforehand.
5. The first change detection map is computed.
6. The scene histogram is computed.
7. The first change detection map is DMAed out.

In these embodiments, the following events are detected by the component.

1. Lighting change: Has the luma intensity significantly changed from the previous frame?
2. Low light: Is the luma intensity in the scene below a threshold level?
3. Camera occlusion: Has the surveillance camera 402 lens been occluded?
4. Static frame: Is the current frame a static frame or is there any motion in it?
5. The scene histogram and cluster sizes are used for detecting first three events. These flags are exports whenever any frame is processed, i.e., even in skipped frames if e_skipped_frames_MD is set to EXPORT.

In one embodiment, the updating unit 414 updates the first background image based on the modified confidence metric. In another embodiment, the updating unit 414 updates the block level noise threshold and the confidence metric based on the first block level change metric.

In another implementation, the motion detector 406 generates a second change detection map by performing change detection based on configurable block sizes (m×n pixels) between the current image and an estimated second background image (not shown). The estimated second background image is updated relatively slower than the estimated first background image. The second change detection map classifies each block as changed or unchanged.

In these embodiments, the motion detector 406 determines a second block level change metric between the current image and the estimated second background image, and classifies whether each block has changed or unchanged by comparing the associated second block level change metric against the associated block level noise threshold.

The updating unit 414 updates the first background image and the second background image based on the classification of each block as changed or unchanged against the estimated first background image and estimated second background image. In one example embodiment, the updating unit 414 updates the first background image when the block is classified as unchanged in at least one of the first change detection map and the second change detection map, and the updating unit 414 updates both the first background image and the second background image when the block is classified as unchanged in both the first change detection map and the second change detection map as described above with respect to FIG. 3.

In these embodiments, the first background image and the second background image are updated as follows. If the estimated first background image's (bg1) update flag is "UPDATE", then bg1 and block level noise threshold ($T_n$) are updated as follows.

$$bg1: B1_n = C2 \times (B1_{n-1}-1) + (1-C2) \times I_n$$

Wherein, $B1_n$ is the updated first background image and $B1_{n-1}$ is estimated first background image, C2 is the confidence map updated in the static regions in the updating step, and $I_n$ refers to the current image.

$$\text{Noise threshold update: } T_{n+1} = (\alpha\_T) \times (T_n) + (1-\alpha\_T) \times \text{block } SSD$$

Wherein, $T_{n+1}$ is the updated block level noise threshold and $T_n$ is the block level noise threshold for the current frame, $\alpha\_T$ is the IIR weighting factor or filter coefficient for the noise threshold, and block_SSD is the block level sum of squared differences.

The equation is implemented as:

$$T_{n+1} = (\alpha\_1 \times T_n) + (\alpha\_2 \times \text{block } SSD)$$

$$\alpha\_1 \rightarrow (=\alpha\_\text{THRESHOLD})$$

$$\alpha\_2 = (1-\alpha\_1) \times \text{SIGMA\_COEFF} \rightarrow \text{Instead of multiplying } SSD \text{ (MACRO)}$$

$\rightarrow$ Block $SSD$ is an 8-bit number, stored $\rightarrow$ after dividing by the block size.

To prevent a sudden increase in block level noise threshold, the block SSD is clipped.

$$\text{If (block } SSD > T_n) \text{ then (block } SSD = T_n)$$

If the estimated second background image's (bg2) update flag is "UPDATE", then bg2 is updated as follows:

$$bg2: B2_n = (\alpha\_B2\_CUR \times B2_{n-1}) + \{(128 - \alpha\_B2\_CUR) \times I_n\}$$

Wherein $B2_n$ is the updated second background image, a recommended value of $\alpha\_B2\_CUR$ is 127, and $B2_{n-1}$ refers to the estimated second background image.

In the current implementation, the update is split in two functions. The first function updates blocks in which both bg1 and bg2 are updated. The second function updates block in which only bg1 is updated. This is done to reduce conditional processing.

In one embodiment as shown in FIG. 4, the motion detection unit 404 resides inside the surveillance camera 402. In another embodiment, the motion detection unit 404 resides inside a physical computing device which is communicatively coupled to a plurality of surveillance cameras via a network as shown in FIG. 5.

Figure 5:
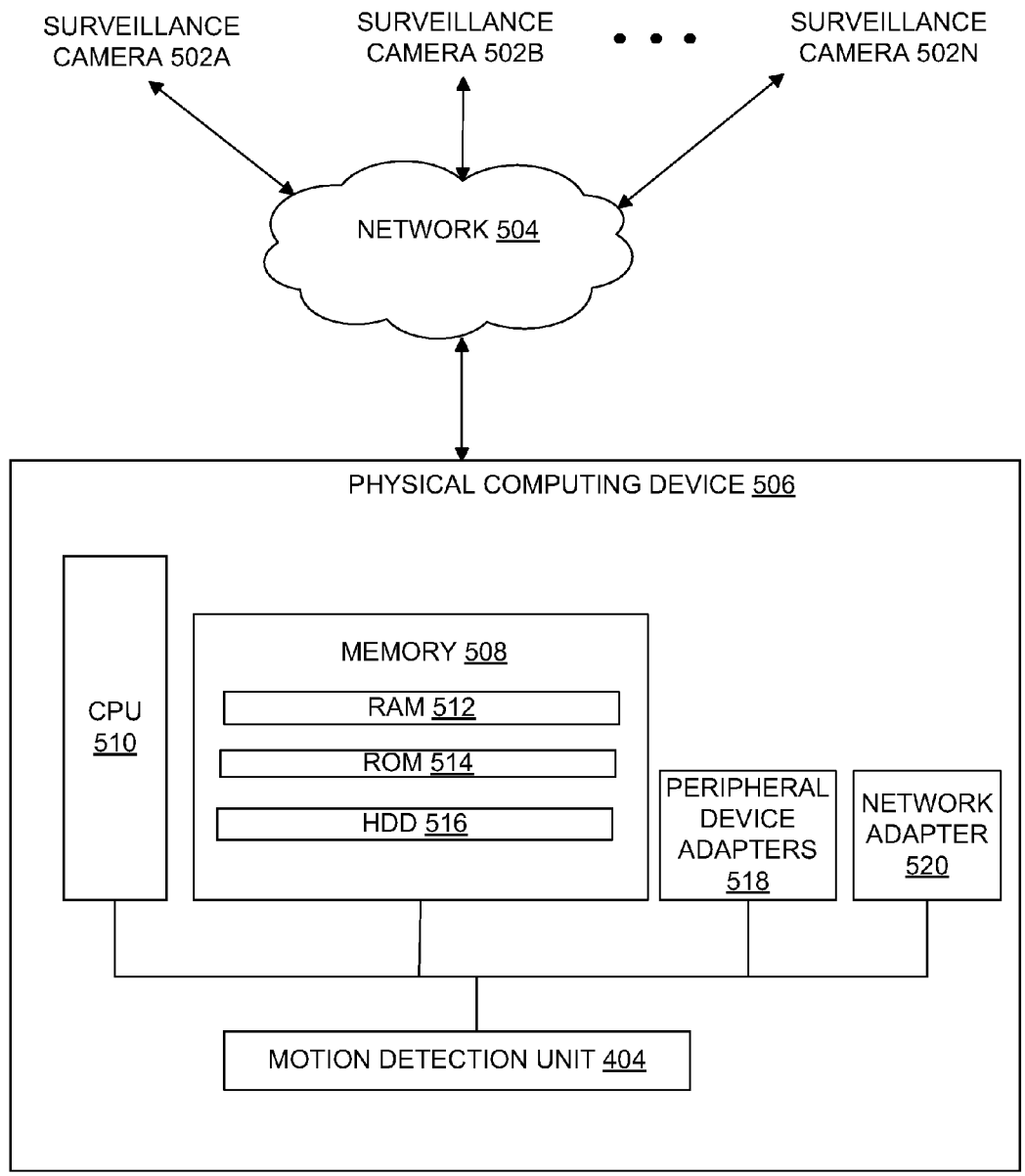
FIG. 5 is a system view illustrating a plurality of surveillance cameras connected to a physical computing device via a network, according to one embodiment.

FIG. 5 is a system view 500 illustrating a plurality of surveillance cameras 502A-N connected to a physical computing device 506 via a network 504, according to one embodiment. Particularly, the physical computing device 506 includes the motion detection unit 404. Further, the physical computing device 506 receives input data (e.g., current image, previous image, and estimated background image) from the plurality of surveillance cameras 502A-N via the network 504.

The physical computing device 506 of the present example is a computing device configured to retrieve the input from the surveillance cameras 502A-N and performs the above described method with respect to FIG. 4 using the motion detection unit 404. In the present example, this is accomplished by the physical computing device 506 requesting the input data from the surveillance cameras 502A-N over the network 504 using the appropriate network protocol (e.g., Internet Protocol ("IP")).

To achieve its desired functionality, the physical computing device 506 includes various hardware components. Among these hardware components may be at least one processing unit 510, at least one memory unit 508, peripheral device adapters 518, and a network adapter 520. These hardware components may be interconnected through the use of one or more busses and/or network connections.

The processing unit 510 may include the hardware architecture necessary to retrieve executable code from the memory unit 508 and execute the executable code. The executable code may, when executed by the processing unit 510, cause the processing unit 510 to implement the method described in FIGS. 1-2. In the course of executing code, the processing unit 510 may receive input from and provide output to one or more of the remaining hardware units.

The memory unit 508 may be configured to digitally store data consumed and produced by the processing unit 510. The memory unit 508 includes various types of memory modules, including volatile and nonvolatile memory. For example, the memory unit 508 of the present example includes Random Access Memory (RAM) 512, Read Only Memory (ROM) 514, and Hard Disk Drive (HDD) memory 516. Many other types of memory are available in the art, and the present specification contemplates the use of any type(s) of memory in the memory unit 508 as may suit a particular application of the principles described herein. In certain examples, different types of memory in the memory unit 508 may be used for different data storage needs. For example, in certain embodiments the processing unit 510 may boot from ROM, maintain nonvolatile storage in the HDD memory, and execute program code stored in RAM.

The hardware adapters (518, 520) in the physical computing device 506 are configured to enable the processing unit 510 to interface with various other hardware elements, external and internal to the physical computing device 506. For example, peripheral device adapters 518 may provide an interface to input/output devices to create a user interface and/or access external sources of memory storage.

A network adapter 520 may provide an interface to the network 504, thereby enabling the transmission of data to and receipt of data from other devices on the network 504, including the surveillance cameras 502A-N.

The above described embodiments with respect to FIG. 5 are intended to provide a brief, general description of the suitable computing environment 500 in which certain embodiments of the inventive concepts contained herein may be implemented.

In one embodiment, the motion detection unit 404 includes a motion detector, a morphological filter, a connected component analysis unit, a blob matching unit, and an updating unit with each component performs the functions as described above with respect to FIG. 4.

In another example embodiment, the motion detection unit 404 described above may be in the form of instructions stored on a non transitory computer readable storage medium. An article includes the non transitory computer readable storage medium having the instructions that, when executed by the physical computing device 506, causes the computing device 506 to perform the one or more methods described in FIGS. 1-5. It will be appreciated that the various embodiments discussed herein may not be the same embodiment, and may be grouped into various other embodiments not explicitly disclosed herein.

The above described methods and systems may provide reasonably good bounding boxes for change regions that can be used as a starting point for advanced tracking needs. The modeled background can also be used as a noise reduced version in static areas to conserve bits when compressed. The estimated background image has the additional advantage of having a quality similar to that achieved with temporal denoising with spatially adaptive noise threshold which can be used in stationary areas to reduce the bit-rate required for encoding the camera captured video. In addition, special modifications are facilitated to allow the entire method/algorithm to run in fixed-point and in a single instruction multiple data (SIMD) friendly manner.

Further, the above described methods and systems may use an efficient row-level pipelining across the different stages of processing such as low-level change detection, different morphological filtering operations, and the connected component analysis. Furthermore, the above described methods and systems has been verified with many indoor and outdoor surveillance camera inputs to verify its robustness. For example, when the above described methods and systems are implemented on a TI C64x (VLIW) processor, change detection and bounding box generation for SIF@10 fps using 2×2 blocks takes less than 20 Million cycles per second (MCPS) and using 4×4 blocks takes less than 10 MCPS.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for low complexity change detection in a sequence of images through background estimation, comprising:
   generating a first change detection map by performing change detection based on configurable block sizes between a current image and one of an estimated first background image and a previous image,
   wherein the first change detection map classifies each block as changed or unchanged,
   wherein generating the first change detection map comprises:
      determining a first block level change metric between the current image and one of the estimated first background image and the previous image;
      computing a confidence metric based on the determined first block level change metric;
      classifying whether each block has changed or unchanged by comparing the associated first block level change metric against an associated block level noise threshold; and
      selection of one of the estimated first background image and the previous image based on the confidence metric for generation of the first change detection map for a next image;
   identifying each connected region based on the changed blocks and assigning a label to each connected region; and
   classifying each labeled region in the current image as changed or unchanged.

2. The method of claim 1, wherein identifying each connected region based on the changed blocks, comprises:
   connecting changed blocks by performing morphological filtering on the first change detection map; and
   identifying each connected region based on the connected changed blocks.

3. The method of claim 2, wherein identifying each connected region based on the connected changed blocks and assigning the label to each connected region comprises:
   grouping the connected changed blocks in a current row of the first change detection map in a raster scan order; and
   merging and labeling the groups in the current row with connected groups in a previous row until all the connected groups are labeled.

4. The method of claim 2, wherein classifying each labeled region in the current image as changed or unchanged comprises:
   determining a matching labeled region in the previous image for each labeled region in the current image;
   computing geometrical properties for each labeled region in the current image; and
   classifying each labeled region in the current image as changed or unchanged based on the computed geometrical properties of the matched labeled regions in the current image and the previous image.

5. The method of claim 4, further comprising:
   modifying the confidence metric of all blocks of the labeled regions in the current image based on the classification.

6. The method of claim 5, further comprising:
   updating the first background image based on the modified confidence metric.

7. The method of claim 6, wherein selection of one of the estimated first background image and the previous image for the next image comprises:
   if selection of one of the estimated first background image and the previous image for the current image is equal to the previous image and the confidence metric is greater than a first threshold, then the updated first background image is selected for the next image;
   if selection of one of the estimated first background image and the previous image for the current image is equal to the previous image and the confidence metric is less than or equal to the first threshold, then the current mage is selected for the next image;
   if selection of one of the estimated first background image and the previous image for the current image is not equal to the previous image and the confidence metric is less than or equal to a second threshold, then the current image is selected for the next image, wherein the second threshold is less than the first threshold; and
   if selection of one of the estimated first background image and the previous image for the current image is not equal to the previous image and the confidence metric is greater than the second threshold, then the updated first background image is selected for the next image.

8. The method of claim 1, further comprising:
   updating the block level noise threshold and the confidence metric based on the first block level change metric.

9. The method of claim 1, further comprising:
   generating a second change detection map by performing change detection based on configurable block sizes between the current image and an estimated second background image, wherein the estimated second background image is updated relatively slower than the estimated first background image, and wherein the second change detection map classifies each block as changed or unchanged.

10. The method of claim 9, wherein generating the second change detection map by performing change detection based on configurable block sizes between the current image and the estimated second background image comprises:
    determining a second block level change metric between the current image and the estimated second background image; and
    classifying whether each block has changed or unchanged by comparing the associated second block level change metric against the associated block level noise threshold.

11. The method of claim 9, further comprising:
    updating the first background image and the second background image based on the classification of each block as changed or unchanged against the estimated first background image and estimated second background image.

12. The method of claim 11, wherein updating the first background image and the second background image comprises:
    updating the first background image when the block is classified as unchanged in at least one of the first change detection map and the second change detection map; and
    updating both the first background image and the second background image when the block is classified as unchanged in both the first change detection map and the second change detection map.

13. A system for low complexity change detection in a sequence of images through background estimation, comprising:
 a motion detector to generate a first change detection map by performing change detection based on configurable block sizes between a current image and one of an estimated first background image and a previous image,
 wherein the first change detection map classifies each block as changed or unchanged,
 wherein the motion detector is further configured to:
  determine a first block level change metric between the current image and one of the estimated first background image and the previous image;
  compute a confidence metric based on the determined first block level change metric;
  classify whether each block has changed or unchanged by comparing the associated first block level change metric against an associated block level noise threshold; and
  select one of the estimated first background image and the previous image based on the confidence metric for generation of the first change detection map for a next image;
 a connected component analysis unit to identify each connected region based on the changed blocks and assign a label to each connected region; and
 a blob matching unit to classify each labeled region in the current image as changed or unchanged.

14. The system of claim 13, further comprising:
 a morphological filter to perform morphological filtering on the first change detection map; and
 wherein the connected component analysis unit to:
  connect changed blocks based on the morphological filtering on the first change detection map; and
  identify each connected region based on he connected changed blocks.

15. The system of claim 14, wherein the connected component analysis unit groups the connected changed blocks in a current roe of the first change detection snap in a raster scan order, and merges and labels the groups in the current row with connected groups in a previous row until all the connected groups are labeled.

16. The system of claim 14, wherein the blob matching unit to:
 determine a matching labeled region in the previous image for each labeled region in the current image;
 compute geometrical properties for each labeled region in the current image;
 classify each labeled region in the current image as changed or unchanged based on the computed geometrical properties of the matched labeled regions in the current image and the previous image; and
 modifies the confidence metric of all blocks of the labeled regions in the current image based on the classification.

17. The system of claim 16, further comprising an updating unit to update the first background image based on the modified confidence metric.

18. The system of claim 13, further comprising an updating unit to update the block level noise threshold and the confidence metric based on the first block level change metric.

19. The system of claim 13, wherein the motion detector generates a second change detection map by performing change detection based on configurable block sizes (m×n pixels) between the current image and an estimated second background image, wherein the estimated second background image is updated relatively slower than the estimated first background image, and wherein the second change detection map classifies each block as changed or unchanged.

20. The system of claim 19, wherein the motion detector determines a second block level change metric between the current image and the estimated second background image, and classifies whether each block has changed or unchanged by comparing the associated second block level change metric against the associated block level noise threshold.

21. The system of claim 20, further comprising an updating unit to update the first background image and the second background image based on the classification of each block as changed or unchanged against the estimated first background image and estimated second background image, and wherein the updating unit updates the first background image when the block is classified as unchanged in at least one of the first change detection map and the second change detection map, and wherein the updating unit updates both the first background image and the second background image when the block is classified as unchanged in both the first change detection map and the second change detection map.

22. An non-transitory computer-readable storage medium for low complexity change detection in a sequence of images through background estimation having instructions that, when executed by a computing device, cause the computing device to perform a method comprising:
 generating a first change detection map by performing change detection based on configurable block sizes between a current image and one of an estimated first background image and a previous image,
 wherein the first change detection map classifies each block as changed or unchanged,
 wherein generating the first change detection map comprises:
  determining a first block level change metric between the current image and one of the estimated first background image and the previous image;
  computing a confidence metric based on the determined first block level change metric;
  classifying whether each block has changed or unchanged by comparing the associated first block level change metric against an associated block level noise threshold; and
  selection of one of the estimated first background image and the previous image based on the confidence metric for generation of the first change detection map for a next image;
 identifying each connected region based on the changed blocks and assigning a label to each connected region; and
 classifying each labeled region in the current image as changed or unchanged.

23. The non-transitory computer-readable storage medium of claim 22, further comprising:
 generating a second change detection map by performing change detection based on configurable block sizes between the current image and an estimated second background image, wherein the estimated second background image is updated relatively slower than the estimated first background image, and wherein the second change detection map classifies each block as changed or unchanged.

24. The non-transitory computer-readable storage medium of claim 23, further comprising:
 updating the first background image when the block is classified as unchanged in at least one of the first change detection map and the second change detection map; and updating both the first background image and the second background image when the block is classified as unchanged in both the first change detection map and the second change detection map.

* * * * *